Jan. 25, 1966  H. HOFMANN  3,230,943
ARRANGEMENT FOR COOLING THE PISTON OF AN INTERNAL
COMBUSTION ENGINE BY A LIQUID COOLANT
Filed May 13, 1964  2 Sheets-Sheet 1

Inventor:
HANS HOFMANN
By K. A. May
ATTORNEY

Jan. 25, 1966  H. HOFMANN  3,230,943
ARRANGEMENT FOR COOLING THE PISTON OF AN INTERNAL
COMBUSTION ENGINE BY A LIQUID COOLANT
Filed May 13, 1964  2 Sheets-Sheet 2
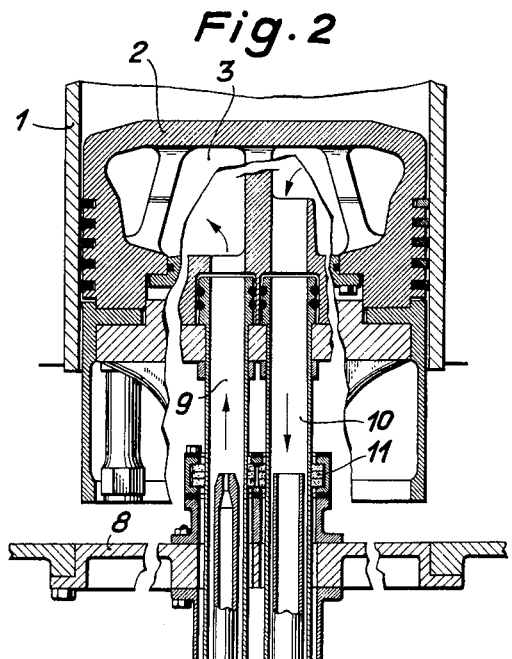
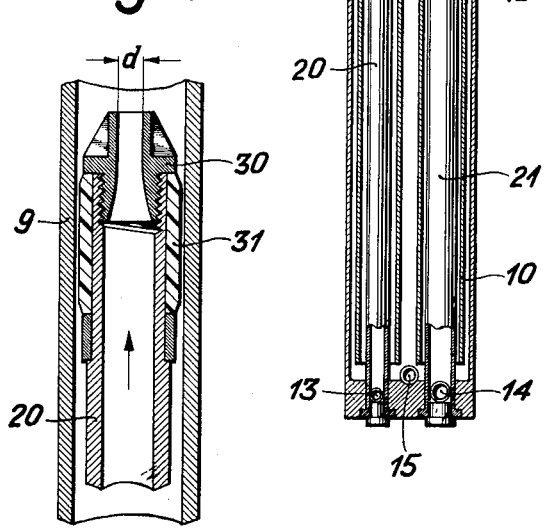
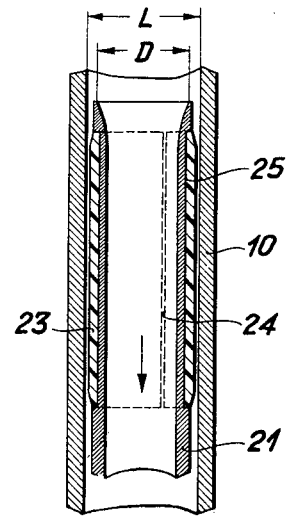
Inventor:
HANS HOFMANN
By K.A. Mayr
ATTORNEY

United States Patent Office 3,230,943
Patented Jan. 25, 1966

3,230,943
ARRANGEMENT FOR COOLING THE PISTON OF AN INTERNAL COMBUSTION ENGINE BY A LIQUID COOLANT
Hans Hofmann, Wiesendangen, Switzerland, assignor to Sulzer Brothers Limited, Winterthur, Switzerland, a corporation of Switzerland
Filed May 13, 1964, Ser. No. 367,124
6 Claims. (Cl. 123—41.36)

This invention relates to liquid cooling of reciprocating pistons of internal combustion engines and more particularly to an internal combustion engine including means for supplying cooling liquid to and discharging cooling liquid from a cavity in the piston and comprising a first moving tube fixed to the piston and extending into a chamber sealed off from the crankcase of the engine, a coolant supply tube secured to the chamber and extending into the first moving tube, a second moving tube fixed to the piston and extending into the, or another, chamber sealed off from the crankcase of the engine, and a coolant discharge tube secured to the chamber into which the second moving tube extends and extending into the second moving tube.

With this arrangement there is very little possibility of coolant escaping into the engine interior. Previous arrangements of this kind have, on the whole, been satisfactory but it has been found that after prolonged operation coolant may escape into the interior of the engine, for example into the crankcase, and this is undesirable.

The invention may be carried into practice in various ways, but one embodiment will now be described by way of example with reference to the accompanying drawings in which:

FIGURE 2 shows a longitudinal section to an enlarged scale of the piston and the cooling arrangement, the view being taken in the direction of the arrow A in FIGURE 1;

FIGURE 3 is a longitudinal sectional view to an enlarged scale of the end of the liquid discharge tube visible in FIGURE 2, and FIGURE 4 shows in longitudinal section the end of the coolant injection tube visible in FIGURE 2, FIGURE 4 being made to the same scale as FIGURE 3.

Figure 1:
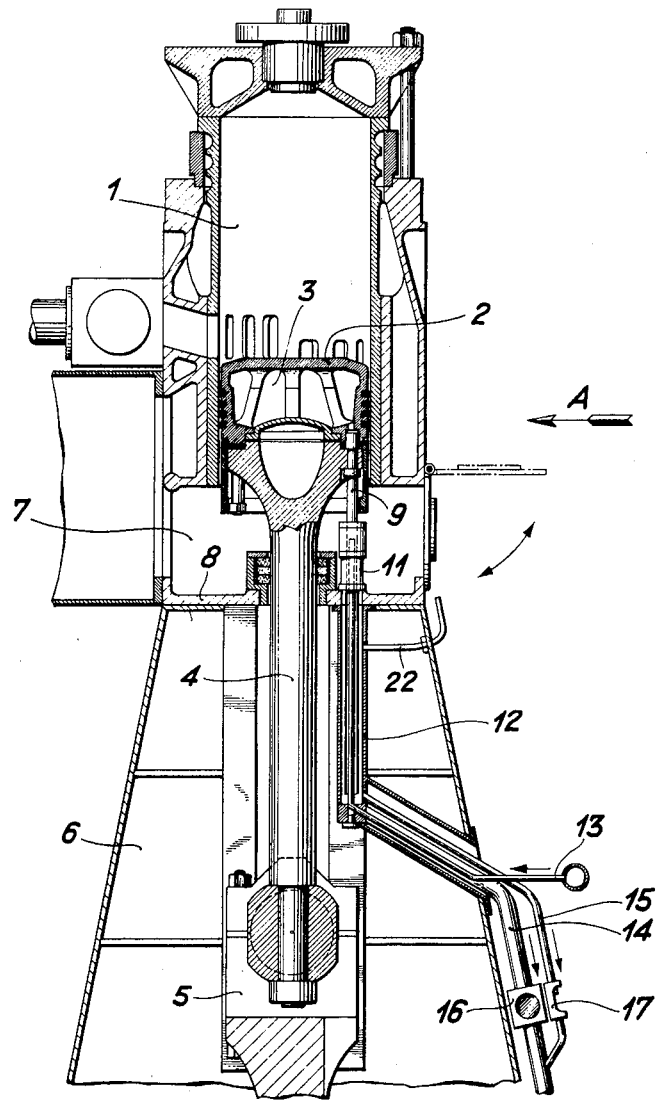
FIGURE 1 is a longitudinal part-sectional view of an engine with liquid cooling according to the invention.

The engine shown in FIGURE 1 has a cylinder 1, a piston 2 having a hollow portion 3, a piston rod 4, a crosshead 5 and a crankcase 6. Between the cylinder 1 and the crankcase 6 is an air space 7 which is separated from the crankcase 6 by a partition 8. The piston is provided with coolant supply and discharge tubes 9, 10 moving with the piston 2 and having equal diameters. Only one of these tubes is visible in FIGURE 1. Both tubes can be seen in FIGURE 2. The tubes 9, 10 extend through a seal 11 into a closed chamber 12 in the crankcase 6. A pipe 13 is connected to the chamber for the supply of coolant, for example water. Also connected to the chamber are coolant return pipes 14, 15 provided with sight glasses 16, 17, respectively.

FIGURE 2 is a view to an enlarged scale of part of the engine shown in FIGURE 1, looking in the direction of the arrow A, and shows the piston 2, the moving tubes 9, 10, the seal 11, the partition 8 and the chamber 12. Projecting upwardly from the bottom of the chamber 12 and into the moving tube 9 is a stationary coolant injection tube 20 to which the coolant supply pipe 13 is connected. Also projecting upwardly from the bottom of the chamber 12 and projecting into the moving tube 10 is a stationary discharge pipe 21 to which the coolant return pipe 14 is connected. The chamber 12 is connected through a tube 22 to the air outside the engine.

FIGURE 3 is a view to an enlarged scale of the upper end portion of the discharge pipe 21. The inlet of the pipe 21 has a diameter D only slightly less than the inner diameter L of the tube 10. Near its end the tube 21 has a guiding sleeve 23 which serves to guide the end of the tube 21 in the moving tube 10 and which also to some extent closes the space between the tube 21 and the tube 10. The sleeve 23 is made of a material having good sliding properties, preferably of plastics. By using a plastics material of high resiliency a structure is made possible as shown, in which the entire sleeve 23 is in one piece and formed with a longitudinal slot 24. The sleeve is received in a recess 25 in the discharge tube 21. To fit the sleeve 23, the sleeve is bent to open the slot 24 and to afford pushing of the sleeve into the recess 25 whereupon the sleeve assumes its original shape.

FIGURE 4 is a view, to the same scale as FIGURE 3, of the outlet end of the injection tube 20 which has a screwed-in nozzle 30 whose outlet aperture has the diameter $d$. As the discharge tube 21 is guided by the sleeve 23 in the moving tube 10, the injection tube 20 is guided in the moving tube 9 by means of a sleeve or bush 31 which need not be longitudinally slotted because it can be passed over the end of the tube 20 before the nozzle 30 is screwed on.

During operation, a stream of water supplied through the pipe 13 issues from the nozzle 30 and passes through the tube 9 to impinge on the inside of the piston head 2'. The water thus introduced into the hollow portion 3 of the piston 2 is churned up and down in the hollow portion 3 as the piston moves. Some of the churning water is removed continuously through the moving tube 10, much of the removed water passing into the discharge tube 21 and thence out of the engine through the pipe 14. Only a small proportion of the water flows along the wall of the moving tube 10 between this tube and the sleeve 23 to reach the bottom part of the chamber 12 for removal therefrom through the pipe 15.

The arrangement of a discharge tube which conveys most of the water discharged from the piston 2 to the pipe 14 directly, prevents any large accumulation of water and obviates the formation of a water surface in the bottom part of the chamber 12. Therefore, the moving tubes cannot cause any splashing of water in the chamber 12 which, in conventional arrangements, results in escape of water through the seals 11 if the seals are not absolutely tight. The arrangement according to the invention definitely prevents leakage of water from the cooling system to the interior of the engine.

For satisfactory operation of the described structure the diameter D of the inlet of the discharge tube 21 should be only slightly smaller than the inside diameter L of the tube 10. Also the cross-section of the inlet of the tube 21 should be at least twice as large as the cross-section (diameter $d$) of the outlet of the injection tube 20. In practice, however, the cross-section of the discharge tube is preferably made much larger for safety reasons and is, for instance, four to eight times as large as the outlet cross-section of the injection tube.

Of course, the two moving tubes 9, 10 which, in the example illustrated, extend into a common chamber 12 may extend into separate chambers. In this case each chamber must be provided with a discharge pipe 15.

I claim:
1. An internal combustion engine comprising:
   a crankcase,
   a chamber in said crankcase,
   a piston having a hollow portion,
   tubes connected to said piston parallel with the longitudinal axis of said piston and communicating said hollow portion, said tubes extending into said chamber, a stationary cooling liquid injection pipe mounted in said chamber and extending into one of said tubes, a cooling liquid supply conduit connected to said cooling liquid injection pipe for supplying cooling liquid thereto, a stationary cooling liquid release pipe mounted in said chamber and extending into the second of said tubes, and a cooling liquid release conduit connected to said cooling liquid release pipe for releasing cooling liquid therefrom.

2. An internal combustion engine as defined in claim 1 wherein said release pipe has a cooling liquid inlet, the flow area of said inlet being at least twice as large as the smallest flow area of said injection pipe.

3. An internal combustion engine as defined in claim 1 wherein said release pipe has a cooling liquid inlet portion, the cross section of said inlet portion being substantially as large as the inside cross section of said second tube, leaving only a clearance required for affording axial movability of said inlet portion in said second tube.

4. An internal combustion engine as defined in claim 1 wherein said release pipe has a cooling liquid inlet portion, an antifriction sleeve surrounding said inlet portion for axially movably sealing said release pipe in said second tube.

5. An internal combustion engine according to claim 4 wherein said sleeve is made of synthetic material.

6. An internal combustion engine according to claim 5 wherein said sleeve has a longitudinal slot.

References Cited by the Examiner
UNITED STATES PATENTS

| | | | |
|---|---|---|---|
| 1,063,615 | 6/1913 | Steinbecker | 123—41.36 |
| 1,180,878 | 4/1916 | Pogue | 123—41.36 |
| 2,569,103 | 9/1951 | Huber | 123—41.36 |

KARL J. ALBRECHT, *Primary Examiner.*